(12) United States Patent
Upadhyaya et al.

(10) Patent No.: US 10,187,778 B2
(45) Date of Patent: Jan. 22, 2019

(54) WAKING NETWORK ACCESS DEVICES BASED ON REQUESTS FOR ASSOCIATION

(71) Applicant: Aruba Networks, Inc., Sunnyvale, CA (US)

(72) Inventors: Vigneshwara Upadhyaya, Bangalore Karnataka (IN); Vikram Limaye, North Sydney (AU); Arunachalaprabhu Gunasekaran, Bangalore Karnataka (IN); Mukundan Gangadurai, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/284,617

(22) Filed: Oct. 4, 2016

(65) Prior Publication Data

US 2017/0223518 A1 Aug. 3, 2017

(30) Foreign Application Priority Data

Jan. 29, 2016 (IN) .............................. 201641003162

(51) Int. Cl.
*H04W 12/06* (2009.01)
*H04W 8/00* (2009.01)
*H04W 88/08* (2009.01)

(52) U.S. Cl.
CPC ........... *H04W 8/005* (2013.01); *H04W 12/06* (2013.01); *H04W 88/08* (2013.01)

(58) Field of Classification Search
CPC ............. H04W 12/06; H04W 52/0219; H04W 52/0274; H04W 52/0206; H04W 8/04; H04W 8/20; H04L 63/0884; H04L 63/0869; H04L 9/3273; G06F 21/31; G06F 1/3203; G06F 21/30; G06F 1/26; G06F 1/325; G06F 1/32
See application file for complete search history.

(56) References Cited

U.S. PATENT DOCUMENTS

| | | | |
|---|---|---|---|
| 7,672,263 B2 | 3/2010 | Sinivaara | |
| 7,839,878 B2 | 11/2010 | Hino et al. | |
| 8,705,375 B2 | 4/2014 | Jaakkola et al. | |
| 8,713,614 B2 | 4/2014 | Dodd | |
| 2009/0040954 A1* | 2/2009 | Usuba | H04W 48/08 370/311 |
| 2010/0120476 A1* | 5/2010 | Zettler | H04W 88/08 455/574 |
| 2010/0284316 A1 | 11/2010 | Sampathkumar | |

(Continued)

OTHER PUBLICATIONS

Dusit Niyato et al., "Adaptive Power Management for Wireless Base Station in Smart Grid Environment," Jan. 28, 2014, pp. 1-22.

*Primary Examiner* — Kwasi Karikari
(74) *Attorney, Agent, or Firm* — Fabian VanCott

(57) ABSTRACT

In one example in accordance with the present disclosure a network access device is described. The network access device includes a radio with a transmitter and receiver to transmit and receive network signals. The device also includes a detection engine to detect a request for association with the network access device. The device further includes a wake-up engine to selectively wake the network access device from a sleep mode when a request for association with the network access device is detected.

19 Claims, 4 Drawing Sheets

(56) References Cited

U.S. PATENT DOCUMENTS

| | | | |
|---|---|---|---|
| 2010/0325720 A1* | 12/2010 | Etchegoyen | H04L 63/1408 726/17 |
| 2012/0165063 A1* | 6/2012 | Scalia | H04W 52/343 455/522 |
| 2013/0182622 A1 | 7/2013 | Lin et al. | |
| 2013/0223303 A1 | 8/2013 | Chandra et al. | |
| 2014/0106828 A1* | 4/2014 | Norman | H04W 52/0206 455/574 |
| 2014/0329498 A1* | 11/2014 | Cherian | H04W 12/06 455/411 |

\* cited by examiner

WAKING NETWORK ACCESS DEVICES BASED ON REQUESTS FOR ASSOCIATION

BACKGROUND

Networks are a widely used component of many enterprises. A network may include wired and wireless components. For example, a wireless access point is a transmitter and receiver of wireless radio signals which wireless radio signals can be used to transmit information and data to and from computing devices, such as mobile phones. The wireless access point can be tied to a wired network. A network access device such as a wireless access point has an operating region wherein a device within that region can transmit and receive data wirelessly to other devices in the operating region.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
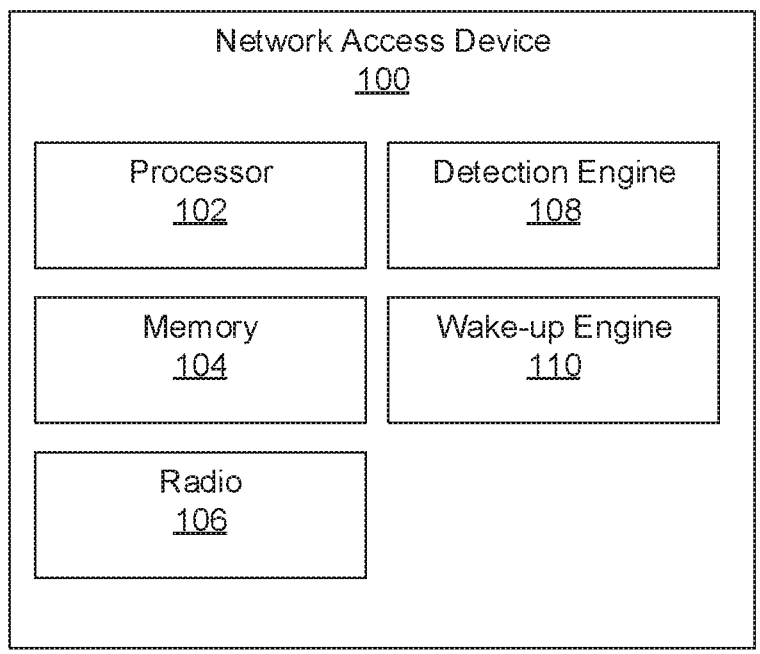
FIG. 1 is a block diagram of a network access device, according to one example of the principles described herein.

As enterprises continue to grow, the desire for networks to be more robust and facilitate greater data collaboration across the entire enterprise, or sections of the enterprise, is also growing. A component of increased data collaboration is the implementation of more efficient and productive wireless networks wherein users can share and access information without a hardwire connection.

Network access devices facilitate such wide-spread access to information and communication between users. Specifically, a wireless access point may provide wireless communication to users of a network. Via the wireless network, users can communicate with other users, download information, upload information, or perform any number of other operations. The wireless access point includes antennas that transmit and receive wireless signals. As the wireless access point is tied to the network infrastructure many services and applications of the network can be accessed wirelessly through a wireless access point. While such wireless network access devices are useful, some effects counter the benefit of their use.

For example, in enterprise networks, the network access devices may be powered on at all times, even during non-use hours such as those after the official work day has ended, during weekends, and on the holidays, regardless of whether or not those network access devices are being used by client devices. The powering of these components during hours when they are not used may result in unnecessary power consumption. This unnecessary power consumption during non-working hours is both wasteful and costly to the enterprise.

Accordingly, attempts have been made to establish a schedule for when a network access device is powered on and off. However, such systems may not account for whether or not client devices are using the service. Accordingly, if a user is accessing the network via the network access device and the network access device turns off per the predetermined schedule, that user may lose access to the network. This could result in lost work, interrupted work, and dissatisfied customers. A related issue is that the scheduled system may have the network access device turned on even when no users are accessing it.

Accordingly, the present specification describes systems and methods for implementing adaptive power management for network access devices to resolve these and other issues. Specifically, the present specification describes an eco-friendly solution which can save power intelligently and also provide seamless network connectivity based on a user's association with the network access device. More specifically, the network access device is in a sleep mode, with just a receiver, detection engine, and wake engine powered on, and once a request for client association is detected, the network access device is woken up, i.e., the remaining components are turned on, on-the-fly to provide connection between the user and the network.

More specifically, when the network access device has been idle for a predetermined period of time, the radio transmitter and other components may be shut off. When in this sleep mode, the receiver of the network access device is still active, listening for a request by a client for network connectivity. The receiver can process the request and, if the client is authenticated, turn on the remaining components of the network access device to provide full connectivity for the client.

Accordingly, the present specification describes a network access device. The network access device includes a radio having a transmitter and a receiver to transmit and receive network signals, respectively. The network access device also includes a detection engine to detect and process a request for association with the network access device and a wake-up engine to selectively wake the network access device from a sleep mode when a request for an association with the network access device is detected.

The present specification also describes a method. According to the method, a request for association is received with a network access device. Authentication of the client device making the request for association is facilitated and components of the network access device are selectively woken from a sleep mode when the client device has been authenticated.

The present specification also describes a non-transitory machine-readable storage medium encoded with instructions. The instructions are executable by a processor to cause the processor to detect, at a wireless access point that a client device is within an operating range of the wireless access point. The instructions also cause the processor to facilitate authentication of the client device and wake up the wireless access point from a sleep mode. The wireless access point is woken up when the client device is within an operating range of the wireless access point and the client device has been authenticated. The instructions also cause the processor to return the wireless access point to the sleep mode when a predetermined period of time without client association has elapsed.

Using client association to wake a network access device 1) allows for automated power management thereby reducing manual interaction; 2) provides seamless network connectivity irrespective of time of day; 3) conserves power by selectively powering on and off the network access device; 4) reduces carbon footprint of enterprise implementing the device; and 5) further reduces cost as a reduced cooling system can be implemented. However, it is contemplated that the devices disclosed herein may provide useful in addressing other matters and deficiencies in a number of technical areas. Therefore the systems and methods disclosed herein should not be construed as addressing any of the particular matters.

As used in the present specification and in the appended claims, the term "client association" or "association" refers to a client device's usage of a network via the network access device. In this example, the client device is associating with the network access device by sending signals to and receiving signals from the network access device.

Further, as used in the present specification and in the appended claims, the term "sleep mode" refers to a state of a network access device wherein multiple components, such as amplifiers, processors, and transmission sub-systems are powered down. "Waking" the network access device from a sleep mode refers to turning on components of the network access device, in some examples all of the components of the network access device.

Further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, that the present apparatus, systems, and methods may be practiced without these specific details. Reference in the specification to "an example" or similar language indicates that a particular feature, structure, or characteristic described in connection with that example is included as described, but may not be included in other examples.

Turning now to the figures, FIG. 1 is a block diagram of a network access device (100), according to one example of the principles described herein. The network access device (100) is a device that provides access to a network. For example, the network access device may be a wireless network access point that allows a client to wirelessly connect to a network. In this example, the radio of the network access device (100) is a wireless radio meaning that it receives and transmits wireless signals.

To achieve its desired functionality, the network access device (100) includes various hardware components. Specifically, the network access device (100) includes a processor (102) and memory (104). The memory (104) is communicatively coupled to the processor (102). The network access device also includes engines which include instructions loaded into memory (104) and executed by the processor (102).

The processor (102) may include the hardware architecture to retrieve executable code from memory (104) and execute the executable code. The executable code may, when executed by the processor (102), cause the processor (102) to implement at least the functionality of selectively turning on components of the radio (106) of the network access device (100) and other components of the network access device (100). In the course of executing code, the processor (102) may receive input from and provide output to a number of the remaining hardware units.

The memory (104) may store data such as executable program code that is executed by the processor (102) or other processing device. As will be discussed, the memory (104) may specifically store computer code representing a number of applications that the processor (102) executes to implement at least the functionality described herein.

The memory (104) may include various types of memory modules, including volatile and nonvolatile memory. For example, the memory (104) of the present example includes Random Access Memory (RAM), Read Only Memory (ROM), and Hard Disk Drive (HDD) memory. Many other types of memory may also be utilized, and the present specification contemplates the use of many varying type(s) of memory (104) as may suit a particular application of the principles described herein. In certain examples, different types of memory (104) may be used for different data storage uses. For example, in certain examples the processor (102) may boot from Read Only Memory (ROM), maintain nonvolatile storage in the Hard Disk Drive (HDD) memory, and execute program code stored in Random Access Memory (RAM).

The memory (104) may include a computer readable medium, a computer readable storage medium, or a non-transitory computer readable medium, among others. For example, the memory (104) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The network access device (100) also includes a radio (106). The radio (106) includes a transmitter to transmit network signals to a client device and the radio (106) also includes a receiver to receive network signals from the client device. As the network access device (100) is connected to the network, these signals are therefore also transmitted to and received from the rest of the network infrastructure including servers, other users, databases etc. As will be described below, the radio (106) or portions of the radio (106) can be deactivated at certain times to conserve power when not in use. For example, when no client association is detected with the network access device (100), the network access device (100) may be put into a sleep mode meaning that the radio (106) transmitter and processor (104) may be powered down. In this example, the network access device (100) is in a listening state, i.e., a receiver of the radio (106) is still turned on. While the present specification specifically describes a wireless access point as a network access device (100) the principles described herein could be implemented with other network access devices (100).

The network access device (100) also includes a number of engines. An engine refers to a combination of hardware and program instructions to perform a designated function. The engines may be hardware. For example, the engines may be implemented in the form of electronic circuitry (e.g., hardware). Each of the engines may include its own processor, but one processor may be used by all the engines. For example, each of the engines may include a processor and memory. Alternatively, one processor may execute the designated function of each of the engines.

A detection engine (108) processes a request for association with the network access device (100). For example, a receiver of the radio (106) detects a request signal and the detection engine (108) processes the request. Specifically, the detection engine (108) detects that a request is received. The request indicates that a client is within an operating range of the network access device (100), the operating range being an area around the network access device that is accessible via the receivers and transmitters of the radio (106) of the network access device (100).

For example, client devices may know an identifier of the network access device (100) such as a Service Set Identifier (SSID) for the network access device (100). More specifically, via a beacon frame previously emitted by the network access device (100), a client device may be aware of the SSID of the network access device (100). Accordingly, the client device can probe for known SSIDs and send a probe request specifically towards that network access device (100), even if the SSID is not being broadcast by the network access device (100). If the SSID of the network access device (100) is hidden, the client device can be programmed with the hidden SSID and can send a probe request to the network access device (100). Alternatively, the client device can send a broadcast probe request identifying any active network access devices (100). While specific reference is made to specific types of detection, the detection device (108) could use other operations to detect a request for association with the network access device (100).

Once a client association has been detected, by a client device coming within the operating range of a network access device (100) and transmitting a probe request towards the network access device (100), a wake-up engine (110) of the network access device (100) selectively wakes up the network access device (100) form a sleep mode. For example, the wake-up engine (110) includes components, i.e., hardware, which awakes the processor (102) and other control components of the network access device (100) by sending an awake signal when there is activity detected on the network. More specifically, other components of the network access device (100) are turned on so as to provide additional services to the client device. Specifically, a transmitter of the radio (106) may be turned on such that signals may be transmitted to the client device. Similarly a processor (102) may be turned on such that received traffic and transmitted traffic are correctly processed and routed throughout the network infrastructure. Other examples of components that are turned off when in a sleep mode, but that are turned on after detecting a request for association include amplifiers and transmission sub-sections.

Such a network access device (100) that relies on actual client association, and not a schedule, to determine when to fully power on allows for improved power consumption as the network access device (100) is fully powered on just when in use. In other words, when there is a likelihood that the network access device (100) will not be used, a number of the power-consuming components of the network access device (100) are powered down and just those components used to receive a probe request are turned on. For example, a receiver of a radio (106), the detection engine (108), and the wake-up engine (110) may be on, but other components such as a transmitter of the radio (106), amplifiers, processors (102), and transmission sub-sections may all be turned off initially and activated after a request for association is received. The effect of the adaptive power system is even more evident when considering the quantity of network access devices (100) that can be used by a single organization such as a large corporation or an educational campus.

Moreover, as powering on is based on client association, seamless network connectivity is provided whereas use of a scheduled system may lead to cutouts of service as a network access device (100) shuts down based on its schedule, even if it is being used to provide a client with network access.

Figure 2:
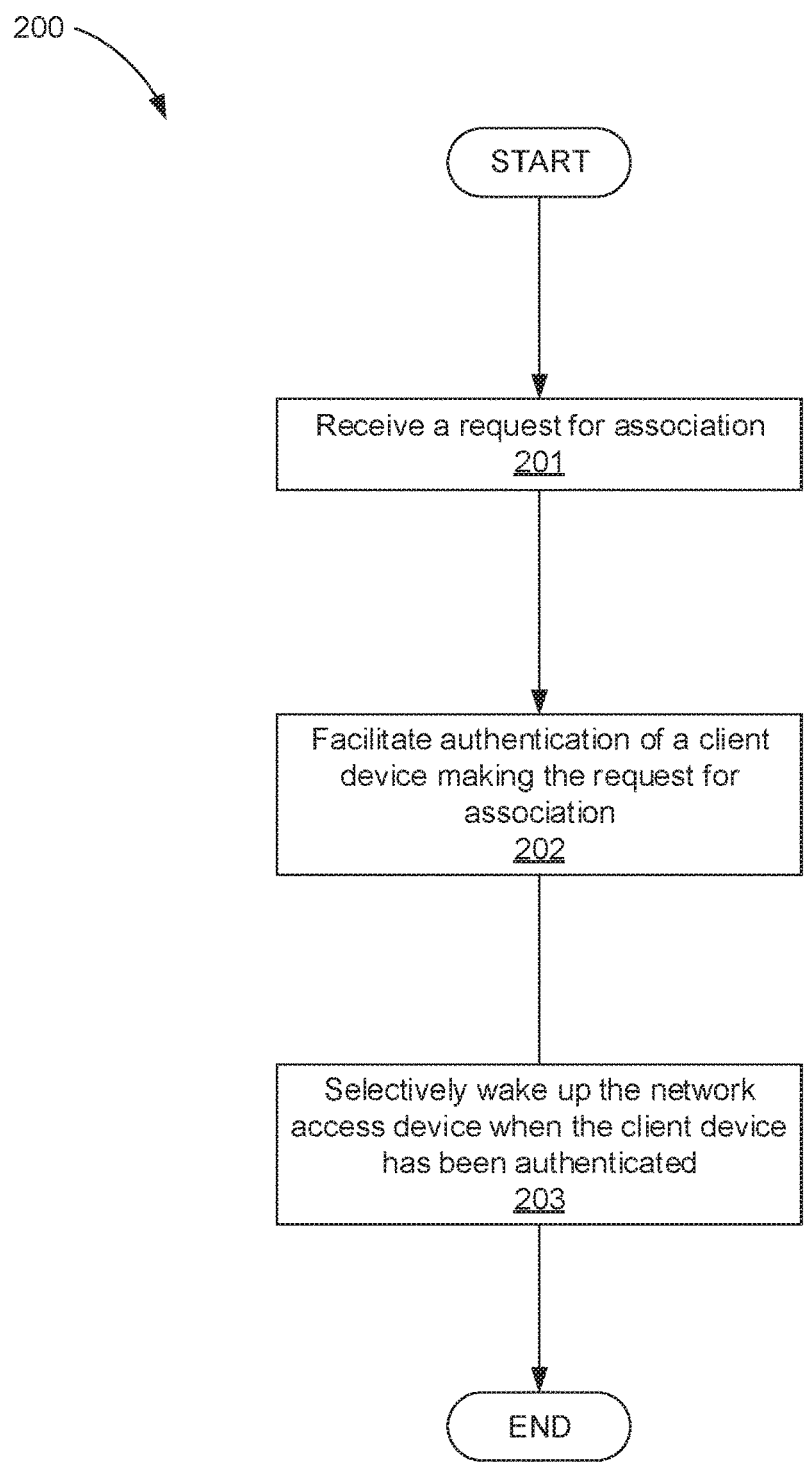
FIG. 2 is a flow diagram for waking a network access device based on requests for association, according to one example of the principles described herein.

FIG. 2 is a flow diagram of a method (200) for waking a network access device (FIG. 1, 100) based on requests for association, according to one example of the principles described herein. As a general note, the method (200) may be described below as being executed or performed by at least one device, for example, the network access device (FIG. 1, 100). Other suitable systems and/or computing devices may be used as well. The method (200) may be implemented in the form of executable instructions stored on at least one machine-readable storage medium of at least one of the devices and executed by at least one processor (FIG. 1, 102) of at least one of the device. Alternatively or in addition, the methods (200) may be implemented in the form of electronic circuitry (e.g., hardware). While FIG. 2 depicts operations occurring in a particular order, a number of the operations of the method (200) may be executed concurrently or in a different order than shown in FIG. 2. In some examples, the method (200) may include more or less operations than are shown in FIG. 2. In some examples, a number of the operations of the method (200) may, at certain times, be ongoing and/or may repeat.

According to the method (200) a request for association with the network access device (FIG. 1, 100) is received (block 201). As the network access device (FIG. 1, 100) can be a wireless access point, the request may be for wireless association with the wireless access point. The request may be received once the network access device (FIG. 1, 100), and more specifically a receiver the detection device (FIG. 1, 108), detects that a receiver of the radio (FIG. 1, 106) has received a probe request sent to the network access device (FIG. 1, 100). In some examples, prior to receiving (block 201) the request, the network access device (FIG. 1, 100) transmitter, and other components, may be turned off. The network access device (FIG. 1, 100) is said to be in a sleep mode when the transmitter and other components are powered down. While in this sleep mode, the network access devices (FIG. 1, 100) consumes less power and thus leads to an overall power savings for the enterprise. In this example then, the network access device (FIG. 1, 100) receives (block 201) the request while in the sleep mode.

The network access device (FIG. 1, 100) may be set to this initial sleep state based on a predetermined schedule. For example, at the end of the business day the network access device (FIG. 1, 100) is put in a sleep mode. That is not to say the network access device (FIG. 1, 100) is to remain in this sleep mode as in a scheduled system; but it can be awoken as described below. When in this sleep mode, the network access device (FIG. 1, 100) consumes little power, just enough to keep the receiver and some other components such as the detection engine (FIG. 1, 108) and the wake-up engine (FIG. 1, 110) on. In this state, the receiver of the radio (FIG. 1, 106) is waiting to receive (block 201) a probe request from a client device.

In some examples, a client may have knowledge of an identifier of the network access device (FIG. 1, 100). For example, via emission of a beacon frame by the network access device (FIG. 1, 100) or by being programed with a hidden identifier of the network access device (FIG. 1, 100), a client device is aware of an identifier for the network access device (FIG. 1, 100) and can therefore scan for the identified and/or hidden identifier, even if that identifier is not being broadcast by the network access device (FIG. 1, 100).

With the request received, authentication of the client device making the request is facilitated (block 202). Authentication may be internal or external to the network access device (FIG. 1, 100). For example, an authentication engine internal to the network access device (FIG. 1, 102) may authenticate the client device. In another example the request may be sent to an external authentication engine for authentication.

There are different forms of authentication that can be carried out. For example in a media access control (MAC) type authentication, the network access device (FIG. 1, 102) sends the client's MAC address, which MAC address is included in the probe request received from the client device, to the authentication engine which can be internal to the network access device (FIG. 1, 100) or external to the network access device (FIG. 1, 100). The authentication engine then authenticates the client device by comparing the MAC address of the client device, as included in the request, against a database of authorized devices. Accordingly, the authentication engine sends an accept request or reject request message based on the MAC address of the client device.

In another example, an 802.1x type authentication is carried out. An 802.1x authentication is based on an Extensible Authentication Protocol. According to this example, the received request is an EAP over LAN (EAPOL) start message. The EAPOL message is an indication to the network access device (FIG. 1, 100) that the client device is configured for 802.1x authentication. The authentication comes as the network access device (FIG. 1, 100) and the client device exchange EAPOL messages back and forth, such as an EAPOL access-request message, an access-challenge message, and an EAPOL-response message are returned between the network access device (FIG. 1, 100) and the client device.

Once authenticated, components of the network access device (FIG. 1, 100) that were previously powered down, are turned on. That is the network access device (FIG. 1, 100) can be selectively woken up (block 203) from a sleep mode when the client device has been authenticated. Waking up (block 203) the network access device (FIG. 1, 100) can include a number of different operations based on the type of authentication performed. For example, in a MAC-type authentication, just the receiver of the radio (FIG. 1, 106) is used. Accordingly, during the authentication process, just the receiver of the radio (FIG. 1, 106) is turned on and the transmitter and other components are still powered down. Accordingly, after the authentication has been completed, waking up (block 203) the network access device (FIG. 1, 10)) includes turning on a radio (FIG. 1, 106) transmitter of the network access device (FIG. 1, 100) and other components, such as amplifiers, processors (FIG. 1, 102) and transmission sub-sections, and accordingly allowing client association with the network access device (FIG. 1, 100).

By comparison, in an 802.1x-type authentication, both the transmitter and the receiver of the radio (FIG. 1, 106) are used. Accordingly, during the authentication process, both the receiver of the radio (FIG. 1, 106) and the transmitter of the radio (FIG. 1, 106) are turned on and other components are still powered down. Accordingly, after the authentication has been completed, waking up the network access device (FIG. 1, 10)) includes turning on the other components of the network access device (FIG. 1, 100) such as the processor (FIG. 1, 102), amplifiers, and transmission sub-sections, and accordingly allowing client association with the network access device (FIG. 1, 100).

If the client device is not authenticated, indicating an unrecognized client device or a malicious client device, the network access device (FIG. 1, 100) may remain in a sleep mode, thereby preventing association with the network via the network access device (FIG. 1, 100).

The method (200) as described herein allows for the selective waking up of the network access device (FIG. 1, 100) upon detection of a request for client association. Doing so reduces power consumption as the network access device (FIG. 1, 100) is just powered on when being used and can accommodate use at any hour of the day, even after regular business hours.

Figure 3:
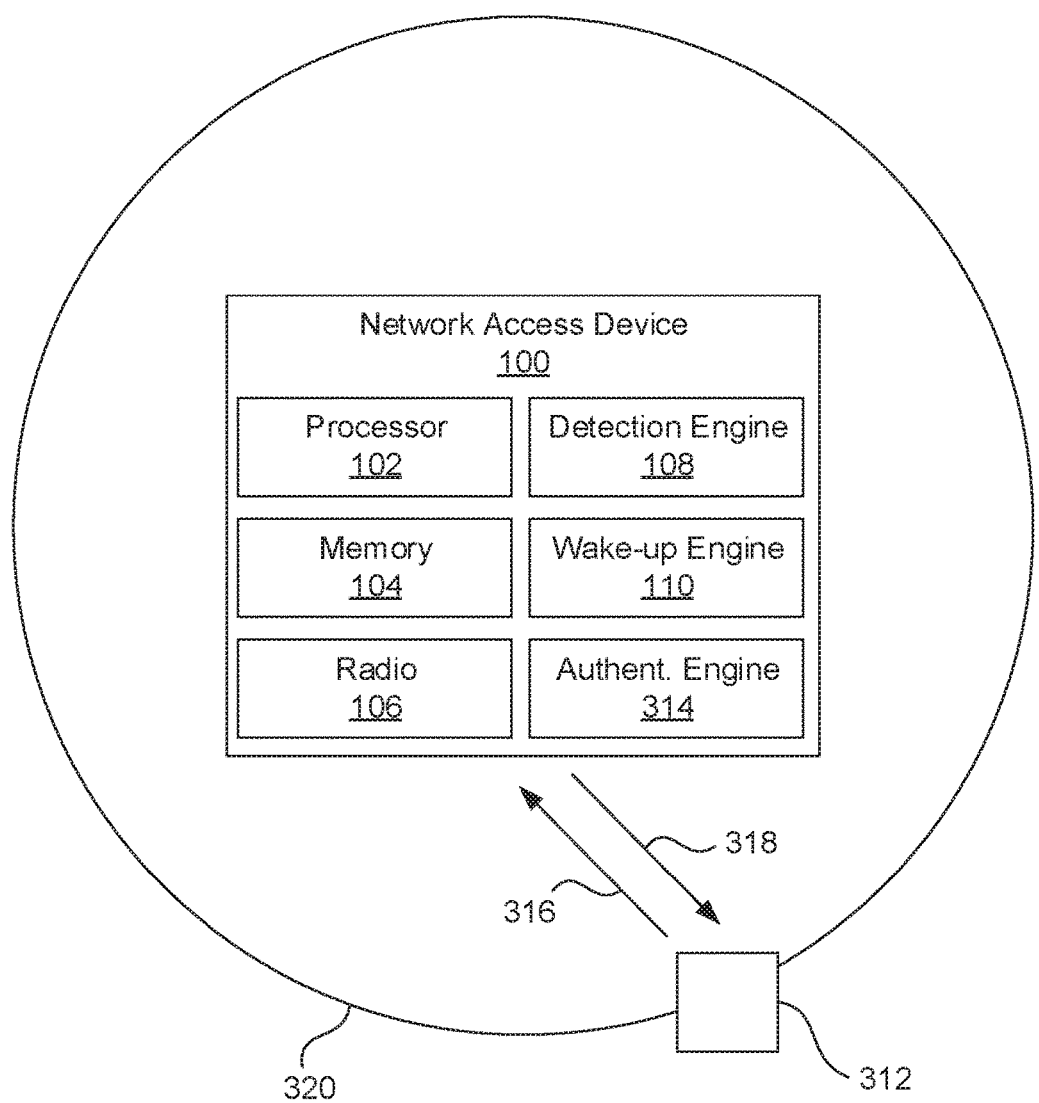
FIG. 3 is a diagram illustrating the interaction between a client device and a network access device, according to one example of the principles described herein.

FIG. 3 is a diagram of the interaction between a client device (312) and a network access device (100), according to one example of the principles described herein. First, once the client device (312) is within an operating range (320) of the network access device (100), a request sent by the client device (312) is received by the radio (FIG. 1, 106) as indicated by the arrow (316). The request is then processed by the detection engine (108). The request may include a MAC address for the client device (312) or may be a request that indicates the client device (312) is configured for 802.1x authentication. While FIG. 3 and others specifically describe a MAC-type authentication or an 802.1x type authentication any type of authentication may be utilized in accordance with the principles described herein.

The client device (312) is then authenticated. An authentication engine (314) while depicted in FIG. 3 as part of the network access device (100) may also be external to the network authentication device (100). As described above various types of authentication may be executed between the client device (312) and the authentication engine (314). Each are now described.

First, in a MAC-type authentication, the request that is sent (316) includes a MAC address for the client device (312). As described above, in a MAC-type operation, a transmitter of the radio (FIG. 1, 106) is not used, and therefore during the authentication process, the wake-up engine (110) is not used. Rather, the authentication engine (314) performs authentication and after authenticating the client device (312) then sends a message to the wake-up engine (110) to wake up the other components of the network access device (100). Such authentication may include comparing the MAC address of the client device (312) against a database.

By comparison in some examples, the request that is sent indicates that an 802.1x protocol is to be used. In this case, the transmitter of the radio (106) is turned on and the authentication engine (314) manages the transmission of a number of authentication messages to the client device (312) as indicated by the arrow (318) as well as receiving authentication messages from the client device (312) as indicated by the arrow (316). As the transmitter of the radio (106) of the network access device (100) is used during authentication, during authentication the wake-up engine (110) turns on the transmitter of the radio (106).

Figure 4:
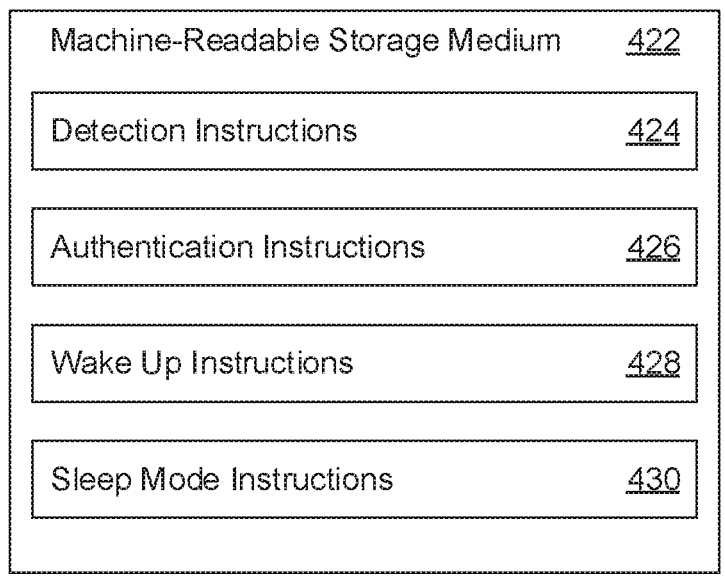
FIG. 4 is a diagram of non-transitory machine-readable storage medium, according to one example of the principles described herein.

FIG. 4 is a diagram of a non-transitory machine-readable storage medium (422), according to one example of the principles described herein. As described above, the network access device (FIG. 1, 100) includes a processor (FIG. 1, 102) and a machine-readable storage medium (422). Although the following descriptions refer to a single processor (FIG. 1, 102) and a single machine-readable storage medium (422), the descriptions may also apply to a network access device (FIG. 1, 100) with multiple processors and multiple machine-readable storage mediums. In such examples, the instructions may be distributed (e.g., stored) across multiple machine-readable storage mediums and the instructions may be distributed (e.g., executed by) across multiple processors.

The processor (FIG. 1, 102) may include at least one processor and other resources used to process programmed instructions. For example, the processor (FIG. 1, 102) may be a number of central processing units (CPUs), microprocessors, and/or other hardware devices suitable for retrieval and execution of instructions stored in machine-readable storage medium (422). In the network access device (FIG. 1, 100) depicted in FIG. 4, the processor (FIG. 1, 102) may fetch, decode, and execute instructions (424, 426, 428, 430) to power up and down the network access device (FIG. 1, 100). As an alternative or in addition to retrieving and executing instructions, the processor (FIG. 1, 102) may include a number of electronic circuits comprising a number of electronic components for performing the functionality of a number of the instructions in the machine-readable storage medium (422). With respect to the executable instruction representations (e.g., boxes) described and shown herein, it should be understood that part or all of the executable instructions and/or electronic circuits included within one box may, in alternate examples, be included in a different box shown in the figures or in a different box not shown.

The machine-readable storage medium (422) represents generally any memory capable of storing data such as programmed instructions or data structures used by the network access device (FIG. 1, 100). The machine-readable storage medium (422) includes a machine readable storage medium that contains machine readable program code to cause tasks to be executed by the processor (FIG. 1, 102). The machine-readable storage medium (422) may be tangible and/or non-transitory storage medium. The machine-readable storage medium (422) may be any appropriate storage medium that is not a transmission storage medium. For example, the machine-readable storage medium (422) may be any electronic, magnetic, optical, or other physical storage device that stores executable instructions. Thus, machine-readable storage medium (422) may be, for example, Random Access Memory (RAM), an Electrically-Erasable Programmable Read-Only Memory (EEPROM), a storage drive, an optical disc, and the like. The machine-readable storage medium (422) may be disposed within the network access device (100), as shown in FIG. 4. In this situation, the executable instructions may be "installed" on the network access device (100). Alternatively, the machine-readable storage medium (422) may be a portable, external or remote storage medium, for example, that allows the network access device (100) to download the instructions from the portable/external/remote storage medium. In this situation, the executable instructions may be part of an "installation package". As described herein, the machine-readable storage medium (422) may be encoded with executable instructions for dual-power reception.

Referring to FIG. 4, detection instructions (424), when executed by a processor (102), may cause the network access device (100) to detect that a client device (FIG. 3, 312) is within an operating range (FIG. 3, 320) of the network access device (FIG. 1, 100) which network access device (FIG. 1, 100) may be a wireless access point. Authentication instructions (426), when executed by a processor (FIG. 1, 102), may cause the network access device (FIG. 1, 100) to facilitate authentication of the client device (FIG. 3, 312). Wake up instructions (428), when executed by a processor FIG. 1, (102), may cause the network access device (FIG. 1, 100) to wake the network access device (FIG. 1, 100) from a sleep mode when the client device (FIG. 3, 312) is within an operating range (FIG. 3, 320) of the network access device (FIG. 1, 100) and the client device (FIG. 3, 312) has been authenticated. Sleep mode instructions (430), when executed by a processor (FIG. 1, 102), may cause the network access device (FIG. 1, 100) to return the network access device (FIG. 1, 100) to the sleep mode when a predetermined period of time without client association has elapsed. The sleep mode instructions (430), when executed by a processor (FIG. 1, 102), may also cause the network access device (FIG. 1, 100) to initially set the network access device (FIG. 1, 100) to the sleep mode based on a predetermined schedule.

In some examples, the processor (FIG. 1, 102) and machine-readable storage medium (422) are located within the same physical component, such as a server, or a network component. The machine-readable storage medium (422) may be part of the physical component's main memory, caches, registers, non-volatile memory, or elsewhere in the physical component's memory hierarchy. Alternatively, the machine-readable storage medium (422) may be in communication with the processor (102) over a network. Thus, the network access device (FIG. 1, 100) may be implemented on a user device, on a server, on a collection of servers, or combinations thereof.

The network access device (FIG. 1, 100) may be part of a general purpose computer. However, in alternative examples, the network access device (FIG. 1, 100) is part of an application specific integrated circuit Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the machine-readable program code, when executed via, for example, the processor (102) of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Using client association to wake a network access device (FIG. 1, 100) 1) allows for automated power management thereby reducing manual interaction; 2) provides seamless network connectivity irrespective of time of day; 3) conserves power by selectively powering on and off the network access device (FIG. 1, 100); 4) reduces carbon footprint of an entity implementing the network access device (FIGS. 1, 100); and 5) further reduces cost as a reduced cooling system can be used. However, it is contemplated that the devices disclosed herein may provide useful in addressing other matters and deficiencies in a number of technical areas. Therefore the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A network access device comprising:
   a processor;
   a memory communicatively coupled to the processor;
   a radio comprising:
      a transmitter to transmit network signals;
      a receiver to receive network signals while the receiver is in an active mode;
   a detection engine to detect and process a request for association with the network access device from a client device;
   an authentication engine to authenticate the client device in response to receipt of the request for association, wherein facilitating authentication of the client device comprises sending the request to an authentication engine that is external to the network access device; and
   a wake-up engine to selectively wake up a subset of a plurality of components of the network access device from a sleep mode based on services to be provided from a client device in response to a successful authentication of the client device, wherein the plurality of components comprises a transmitter, the processor, an amplifier, and a transmission sub-section.

2. The network access device of claim 1 wherein:
   the radio is a wireless radio; and
   the network access device is a wireless network access point.

3. The network access device of claim 1, wherein, while in the sleep mode, the receiver of the radio is turned on to receive the request for association with the network access device.

4. The network access device of claim 1, wherein the detection engine detects that a client device making the request is within an operating range of the detection engine.

5. The network access device of claim 1, further comprising an authentication engine internal to the network access device to facilitate authentication of a client device requesting association with the network access device.

6. The network access device of claim 5, wherein the authentication engine authenticates the client device via an 802.1x authentication protocol.

7. A method comprising:
   receiving, at a receiver of a network access device, a request for association from a client device while the receiver is in an active mode, wherein the request includes a MAC address for the client device;
   authenticating the client device making the request for association, wherein the authentication occurs in response to receipt of the request for association, and wherein authenticating the client device comprises comparing the MAC address for the client device against a database of authorized devices; and
   selectively waking up a subset of a plurality of components of the network access device from a sleep mode based on services to be provided to the client device in response to successful authentication of the client device, wherein the plurality of components comprises a transmitter, a processor, an amplifier, and a transmission sub-section.

8. The method of claim 7, wherein the request is a request for wireless association with a wireless access point.

9. The method of claim 7, wherein waking up the network access device comprises:
   waking up a processor of the network access device from a sleep mode;
   turning on the radio transmitter of the network access device; and
   allowing client association with the network access device.

10. The method of claim 7, wherein:
    the request is an Extensible Authentication Protocol over Local-Area Network (EAPOL)-start message;
    authenticating the client device comprises transmitting and receiving EAPOL messages to and from the client device; and
    the radio transmitter of the network access device is turned on during authentication to transmit EAPOL messages to the client device.

11. The method of claim 7, wherein facilitating authentication of the client device comprises sending the request to an authentication engine that is external to the network access device.

12. The method of claim 7, further comprising receiving the request for association with the network access device when the network access device is in the sleep mode.

13. A non-transitory machine-readable storage medium encoded with instructions, the instructions executable by a processor to cause the processor to:
   detect, at an active mode receiver of a wireless access point, that a client device is within an operating range of the wireless access point;
   receive a request for authentication from the client device;
   authenticate the client device in response to receipt of the request for authentication, wherein facilitating authentication of the client device comprises sending the request to an authentication engine that is external to the wireless access point;
   selectively wake up a subset of a plurality of components of the wireless access point from a sleep mode based on services to be provided to the client device in response to a successful authentication of the client device, wherein the plurality of components comprises a transmitter, the processor, an amplifier, and a transmission sub-section; and
   return the plurality of components of the wireless access point to the sleep mode when a predetermined period of time without client association has elapsed.

14. The machine-readable storage medium of claim 13, further comprising instructions executable by the processor to cause the processor to initially set the wireless access point to the sleep mode based on a predetermined schedule.

15. The machine-readable storage medium of claim 13, wherein the instructions executable to detect that a client device is within an operating range of the wireless access point further comprise instructions executable to determine that the client device is transmitting a probe request.

16. The machine-readable storage medium of claim 13, wherein the instructions executable to selectively wake up a subset of a plurality of components include instructions executable to transmit an awake signal to the subset of the plurality of components.

17. The machine-readable storage medium of claim 13, wherein the instructions executable to selectively wake up a subset of a plurality of components include instructions executable to:
- determine a likelihood that the wireless access point is to be used; and
- provide power to a subset of the plurality of components used to receive a probe request in response to the likelihood.

18. The machine-readable storage medium of claim 17, further comprising instructions executable to refrain from providing power to the plurality of components including the processor, the amplifier, and the transmitter.

19. The machine-readable storage medium of claim 17, wherein the instructions to selectively wake up a subset of a plurality of components include instructions executable to:
- provide power to a different subset of the plurality of components used to receive a probe request in response to the likelihood.

\* \* \* \* \*